United States Patent

Kihara et al.

[15] 3,689,007

[45] Sept. 5, 1972

[54] CASSETTE HAVING MEANS THEREON TO VARY ITS SIZE

[72] Inventors: Nobutoshi Kihara; Yotaro Miura, both of Tokyo, Japan

[73] Assignee: Sony Corporation, Tokyo, Japan

[22] Filed: Aug. 5, 1970

[21] Appl. No.: 61,188

[30] Foreign Application Priority Data

Jan. 24, 1970 Japan ........................45/6476

[52] U.S. Cl. .......................242/199, 206/52 F, 220/8
[51] Int. Cl. ............................................G11b 23/10
[58] Field of Search.....242/199, 200, 198, 197, 71.1, 242/71.2; 206/52; 352/72, 78; 220/8; 274/40, 4 C, 11 B, 11 C

[56] References Cited

UNITED STATES PATENTS

| | | | |
|---|---|---|---|
| 968,633 | 8/1910 | Andrews | 220/8 |
| 2,876,924 | 3/1959 | Chrisman | 220/8 |
| 2,907,487 | 10/1959 | Harrington | 220/8 |
| 2,989,261 | 6/1961 | Gillette et al. | 242/200 |

*Primary Examiner*—George F. Mautz
*Attorney*—Lewis H. Eslinger, Alvin Sinderbrand and Curtis, Morris & Safford

[57] ABSTRACT

A tape cassette for use with tape recorders and players in which one of the walls forming the cassette is movable to selectively vary the size of the cassette whereby it can be used with non-standard size cassette holders.

8 Claims, 2 Drawing Figures

INVENTOR.

BY NOBUTOSHI KIHARA
YOTARO MIURA

INVENTOR

BY NOBUTOSHI KIHARA
YOTARO MIURA

CASSETTE HAVING MEANS THEREON TO VARY ITS SIZE

There are numerous tape record/playback mechanisms being marketed throughout the world which are adapted to receive cassettes. These cassettes are compact devices which house a take-up and a supply reel for maintaining the magnetic tape therein in which the reels can either lie in the same plane or they can be situated in spaced planes. The user merely places the cassette into a receiver in the tape player/recorder thereby obviating the necessity of excess handling of the tape and the reels associated therewith.

Unfortunately different manufacturers and even the same manufacturers make cassettes of various sizes which are either too small or too large for a cassette receiver.

This invention serves to overcome this disadvantage of the tape cassette by providing a cassette which is adjustable in size.

To accomplish this end, one of the walls of the cassette is structured so as to be laterally movable away from the remaining walls. It can be readily seen that by utilizing such a structure the size of the cassette can be made adjustable to fit a wide range of cassette receivers.

It is a principal object of this invention to provide a tape cassette which is adjustable in size.

It is an additional object of the invention to provide a tape cassette which is adjustable by making a portion of the cassette laterally movable.

It is another object of the invention to provide a tape cassette in which the size of the cassette is made adjustable by having a movable wall thereon.

It is yet a further object of the invention to provide an inexpensive, reliable and simple to fabricate system for adjusting the size of a tape cassette.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawing in which.

Figure 1:
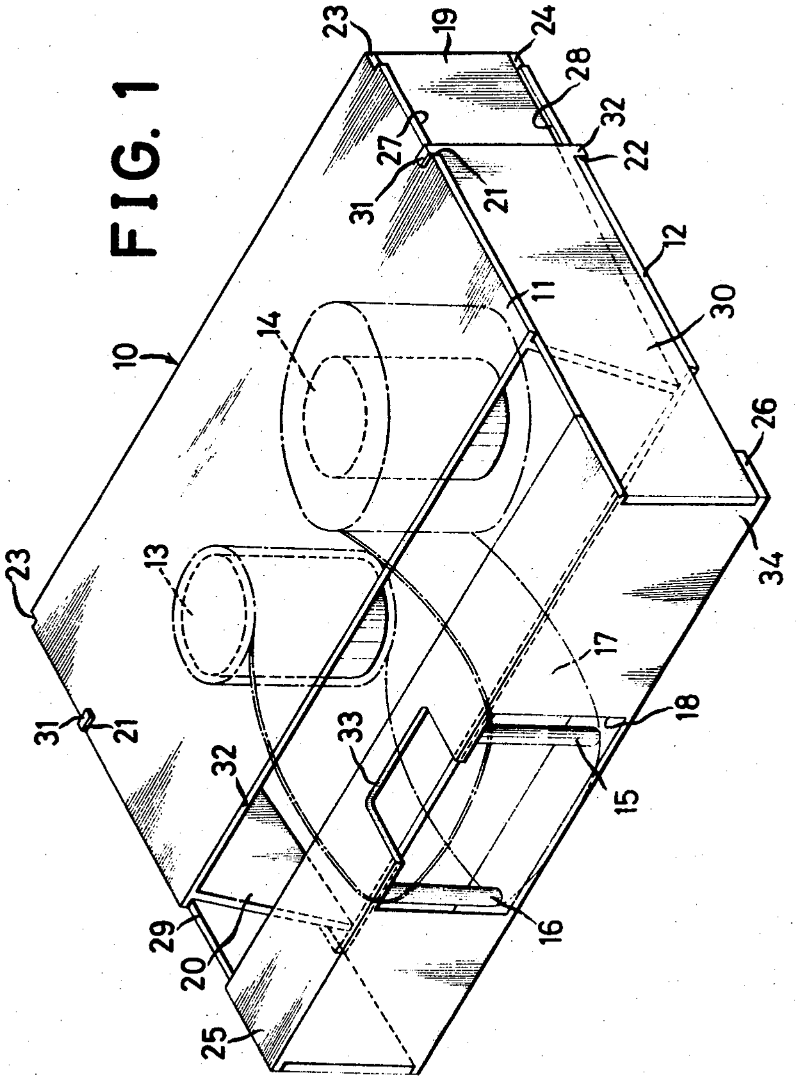
FIG. 1 is a perspective view showing the cassette with a movable front wall.

Referring to FIG. 1, there is shown a cassette 10 having spaced upper and lower walls 11 and 12 respectively. The walls are vertically spaced to the extent necessary to accommodate either horizontally spaced reels 13, 14 as shown in FIG. 1 or coaxial reels which are vertically spaced (not shown). The housing can also have located therein, between the upper and lower spaced walls 11 and 12, guide pins 15 and 16 which serve to properly orient the magnetic tape 17 in the opening 18. A pair of parallel spaced walls 19 and 20 are fixed to the upper and lower walls 11 and 12 slightly inwardly of the ends of the walls so as to form ledges 27, 28 which are parallel to each other on opposed sides of the cassette. Notches 21, 22, 23 and 24 are cut into the upper and lower walls 11 and 12. The ledges 27 and 28 extend between the notches 21, 23, 22 and 24.

The ledges 27 and 28 are preferably the width of one of the movable walls 29 and 30. The movable walls 29 and 30 are T-shaped in which the cross bar of the "T" fits respectively within the notches 21, 22 or the notches 23,24. The movable walls 29 and 30 fit against the walls 19 and 20.

Fixed to the forward portions of the movable walls 29 and 30 are upper and lower parallel walls 25 and 26 which are spaced apart the same amount as walls 11 and 12. An opening 33 is formed in the upper wall 25 to allow a tape guiding member (not shown) to be inserted behind the tape 17 whereby it can be withdrawn from the cassette 10 in the form of a loop. Further detail as to the mechanism for withdrawing the tape at this point is unnecessary since this forms no part of this invention. A front wall 34 is fixed to the upper, lower and side walls and has an opening 18 therein whereby a portion of the tape 17 is exposed, enabling the aforementioned guide member to get into the cassette 10 and draw out the tape.

The walls including a real wall 35 forming the cassette 10 can be made of any material, however, plastic has been found to be the most preferable material. The movable walls 29 and 30 should be preferably flexible so that they can be urged out of the notches 23 and 24 by flexing them outwardly and when the projections 31 and 32 are placed in the notches 23 and 24, the sidewalls 29, 30 will return to their unflexed, rest position. The notches thereby serve to maintain the sidewalls 29 and 30 relatively secure and preclude longitudinal movement of the sidewalls thereby acting as stops.

Figure 2:
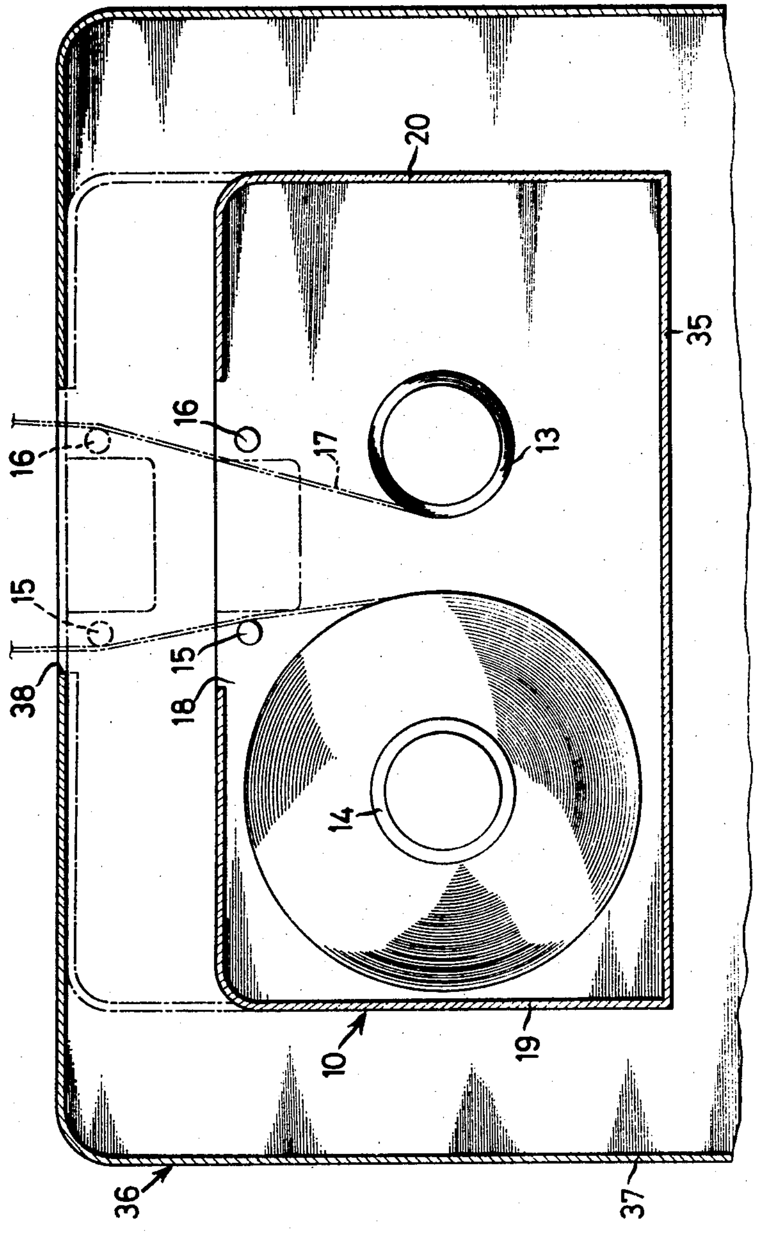
FIG. 2 is a top view of the cassette in a cassette holder.

Referring to FIG. 2, there is shown a cassette 10 which is placed within a large cassette holder 36. The holder or receiver 36 is formed with upstanding walls 37 and the front wall has an opening 38 therein for the reception of a tape guiding member as explained above. Since the fingers must get behind the tape 17 and they are not designed to reach deeply into the cassette 10, but only extend slightly into the opening 38 in the holder 36, the cassette 10 must be moved forward. The reels 13 and 14 are mounted on drive shafts (not shown) which extend upwardly into the respective reels through the holder 36, therefore, the reels fix the location of the cassette with respect to the holder. Therefore, in order to bring the tape 17 to a position adjacent the opening 38, the forward portion of the cassette 10 must be physically moved to this position. To accomplish this, the user merely grips the sidewalls 29 and 30 and bends them outwardly away from each other. When the walls have been moved to a point outside the limit of the ledges 27 and 28, the walls can be slid forward until the projections 31 and 32 become engaged in the notches 21 and 22 respectively. The forward wall 34 of the cassette 10 will now be adjacent the inner front wall of the holder 36 and the cassette opening 18 will align with the holder opening 38 as shown in phantom lines in FIG. 2. The tape 17 will now be exposed in the openings 18 and 38 and can be readily grasped.

In view of the detailed description included above, the operation of the cassette of the present invention will readily be understood by those skilled in the art. While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed is:

1. A magnetic tape cassette comprising:

A. Reel means having a length of tape wound thereon; and

B. A housing enclosing said reel means and comprising:

1. a front wall having an opening therein through which a length of said tape can be extracted,
2. a rear wall substantially parallel to said front wall, said front and rear walls being relatively movable perpendicular to each other between at least a first position and a second position, and
3. top, side, and bottom wall members joining said front and rear walls, a portion of said top wall member adjacent said front wall having an opening communicating with said opening in said front wall to facilitate access to said tape, and said sidewall members engaging adjacent other wall members to provide at least first and second connection detents corresponding to said first and second relative positions of said front and rear walls.

2. The cassette of claim 1 in which said sidewall members comprise:

A. First and second sidewall members attached to opposite ends of said front wall and extending substantially perpendicular thereto;

B. Locking means on said first and second sidewall members; and

C. Cooperating means on said adjacent other wall members to interlock with said locking means to hold said sidewall members and thus said front and rear walls in either of said first and second relative positions.

3. The cassette of claim 2 in which said locking means comprise projections extending from said first and second sidewall members and said cooperating means comprise notches in edge portions of said top and bottom wall members to receive said projections.

4. The cassette of claim 3 in which the width of said first and second sidewall members is substantially equal to the distance between said edge portions, and said projections project over said edge portions, whereby said projections hold said first and second sidewall members in alignment in moving between said first and second positions.

5. The cassette of claim 3 in which said locking means are made of resilient material to resiliently press against said edge portions when said locking means are between said notches.

6. The cassette of claim 3 in which said sidewall members comprise, in addition, third and fourth sidewall members fixedly attached to said rear and cooperating with said rear wall and top and bottom wall members to form a rear part of said housing.

7. The cassette of claim 6 in which said reel means are rotatably mounted in said rear part.

8. The cassette of claim 1 in which said reel means comprise first and second reels spaced apart side-by-side and in the same plane.

* * * * *